(12) United States Patent
Milton et al.

(10) Patent No.: US 7,663,070 B2
(45) Date of Patent: Feb. 16, 2010

(54) FOUR-WAY ROCKER SWITCH WITH DISPLAY

(75) Inventors: Stephen Michael Milton, Freehold, NJ (US); William Toth, Ocean, NJ (US)

(73) Assignee: Avaya Inc., Basking Ridge, NJ (US)

( * ) Notice: Subject to any disclaimer, the term of this patent is extended or adjusted under 35 U.S.C. 154(b) by 371 days.

(21) Appl. No.: 11/477,927

(22) Filed: Jun. 30, 2006

(65) Prior Publication Data
US 2008/0004066 A1 Jan. 3, 2008

(51) Int. Cl.
*H01H 13/76* (2006.01)
*H01H 9/00* (2006.01)

(52) U.S. Cl. ...................... 200/315; 200/309
(58) Field of Classification Search .......... 200/5 R–5 F, 200/309, 315, 18
See application file for complete search history.

(56) References Cited

U.S. PATENT DOCUMENTS

| | | | | |
|---|---|---|---|---|
| 4,975,547 A | * | 12/1990 | Nakayama et al. | 200/5 R |
| 5,818,361 A | * | 10/1998 | Acevedo | 341/23 |
| 5,914,676 A | * | 6/1999 | Akpa | 341/23 |
| 6,344,618 B1 | | 2/2002 | Sato | |
| 6,723,930 B2 | * | 4/2004 | Minami | 200/6 A |
| 6,765,158 B1 | * | 7/2004 | Morrison et al. | 200/5 R |
| 6,798,359 B1 | * | 9/2004 | Ivancic | 341/23 |
| 6,824,321 B2 | * | 11/2004 | Ward et al. | 400/479 |
| 2002/0149568 A1 | * | 10/2002 | Kim | 345/170 |
| 2003/0132915 A1 | * | 7/2003 | Mitchell | 345/168 |

OTHER PUBLICATIONS

Samsung A930 user Manual :: phonedog.com/cell-phone-research/samsung-sch-a930_user-manual.aspx :: Mar. 16, 2006.*

* cited by examiner

*Primary Examiner*—Renee S Luebke
*Assistant Examiner*—Sean Kayes
(74) *Attorney, Agent, or Firm*—Muncy, Geissler, Olds & Lowe, PLLC

(57) ABSTRACT

A rocker switch for a cell phone having a display mounted thereon. A five-position rocker switch, as is commonly used in cell phones, has a display device mounted directly thereon. The display indicates the function of the five switches, which may vary with time. Accordingly, different menus or levels of screens are possible. Contacts with the corner switches are disabled if movement is within 20 degrees of vertical to avoid erroneous inputs.

10 Claims, 4 Drawing Sheets

FOUR-WAY ROCKER SWITCH WITH DISPLAY

BACKGROUND OF THE INVENTION

1. Field of the Invention

The present invention relates to a rocker switch for an electronic device and more particularly to a four-way rocker switch having a display mounted thereon for use in a cell phone.

2. Discussion of the Background

In order to miniaturize the input devices for electronic systems, the rocker switch has been designed, which allows five different contact possibilities for a single switch which can be manipulated over a relatively small area. One such device is shown, for example, in U.S. Pat. No. 6,344,618. FIGS. 1 and 2 of the present application show a device such as described in that patent.

A case 31 is provided in a generally box shape with an open top. A cover 32 is provided which covers the open top of the case. The inner bottom surface of the case has a central stationary contact 33 and a corresponding outer stationary contact 34 arranged in the center portion thereof. Four peripheral stationary contacts 35 (only one of which is shown) are placed in the four corners of the bottom surface of the case. Terminals 40, 42, 43 and 44, as well as other terminals which are hidden from view, are connected to these six contacts to connect with an electronic device. A movable contact 45 is made of a thin resilient metal sheet and disposed so that the center is over the central contact 33 and the periphery rests on stationary contact 34. A manipulation body 46, including a shaft 46A, a flange 46B and a projection 46C rests on and is supported by the movable contact 45. The flange portion of the manipulation body is housed within the case and extends upwardly through a central hole in the cover 32. The flange 46B has a metal contact plate 47 arranged on four sides. A manipulation knob 48 is attached to the upper end of the manipulation body 46.

In operation, the manipulation knob 48 is controlled by the user and may be moved to any of five positions for actuation. If the knob is depressed directly downwardly, the contact is made between central contact 33 and outer contact 34. If the knob is tilted toward any of the four corners, the contact plate 47 will come into contact with the corresponding contact 35 to actuate that contact. Accordingly, it is possible for the user to select any of the four corner contacts or the center contact for actuation merely by manipulating the knob 48.

When similar products are used on a cell phone, the amount of space available for the various buttons and displays is very limited. In order to reuse space, many devices use soft keys for some functions. However, these keys consume display screen real estate and provide a relatively small display area. In addition, the close proximity of buttons on the small devices such as cell phones increases the susceptibility to an accidental button press. Accordingly, it is highly desirable to utilize arrangements which save space both for buttons and displays and which allow easy control of the various buttons.

SUMMARY OF THE INVENTION

The present invention provides a rocker switch having a display mounted thereon.

The present invention further provides a compact arrangement of a rocker switch and a display device which saves space.

The present invention still further provides a four-way rocker switch useable for cell phones and other electronic devices where the display is mounted on the switch to save space.

The present invention still further provides a rocker switch having a display mounted on the upper surface thereof in order to provide a changeable display of the key functions.

The present invention further provides a rocker switch having a display mounted thereon and held by a retention clip.

The present invention also provides a rocker switch with a display mounted thereon and having an enabling device so that a corner switch is not actuated when a vertical movement occurs.

The present invention achieves this by providing a four-way rocker switch having a manipulator plate for actuating the rocker switch on which is placed a display device held by a retention clip for maintaining the display in position. When the manipulator plate is moved either vertically or into the corners, the various contacts are actuated for a signal to the enabling device. An enabling device forwards the signals from the switches to a circuit board.

BRIEF DESCRIPTION OF THE DRAWINGS

The present invention will become more fully understood from the detailed description given hereinbelow and the accompanying drawings, which are given by way of illustration only, and thus are not limitative of the present invention, and wherein.

DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
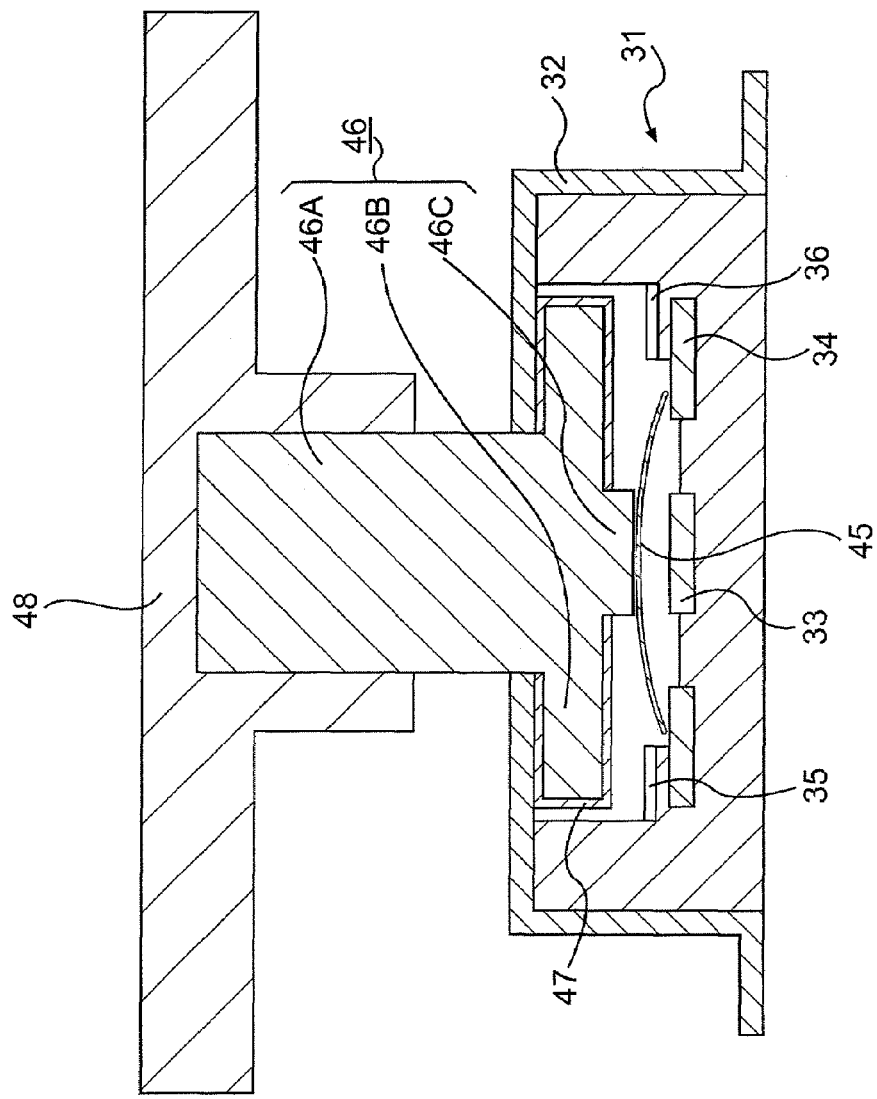
FIG. 1 is a cross-sectional view of a prior art switch device.
Figure 2:
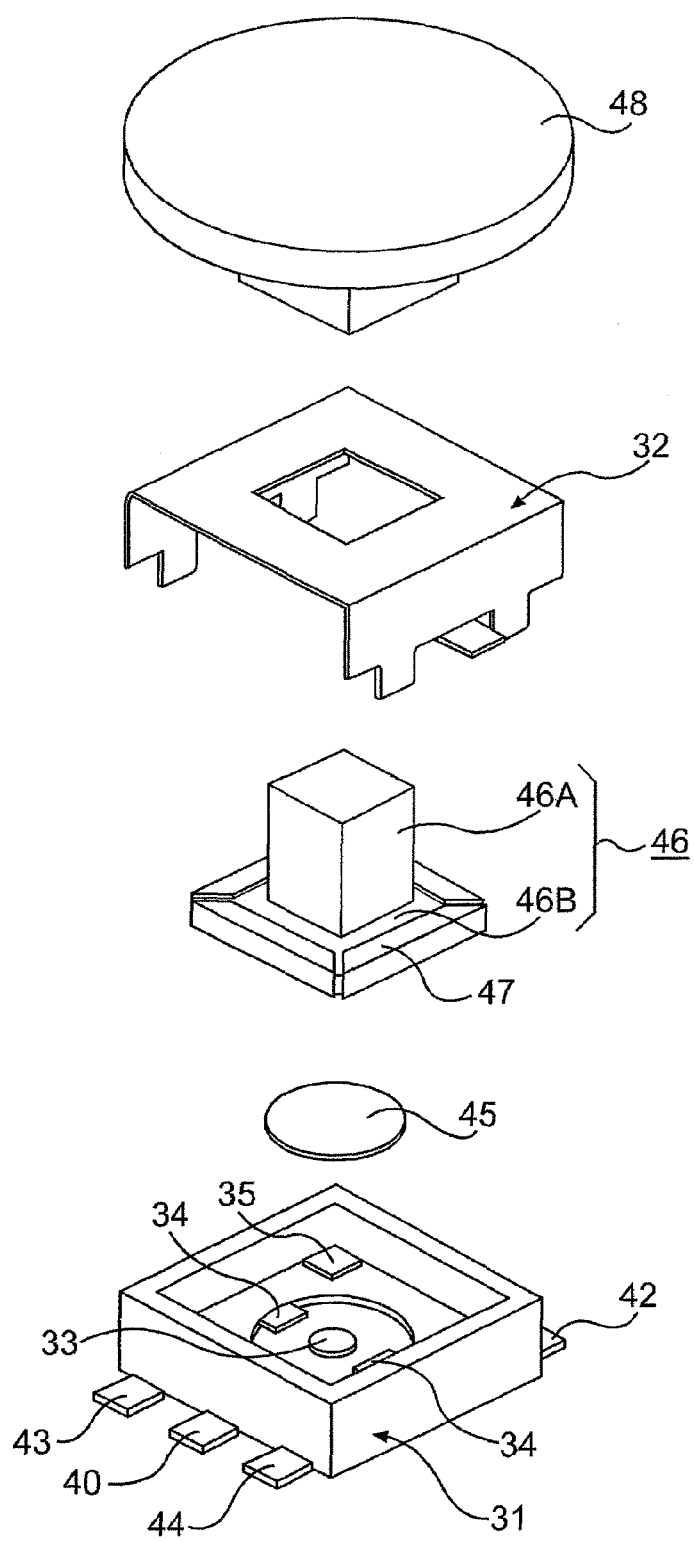
FIG. 2 is an exploded view of the prior art device of FIG. 1.
Figure 3:
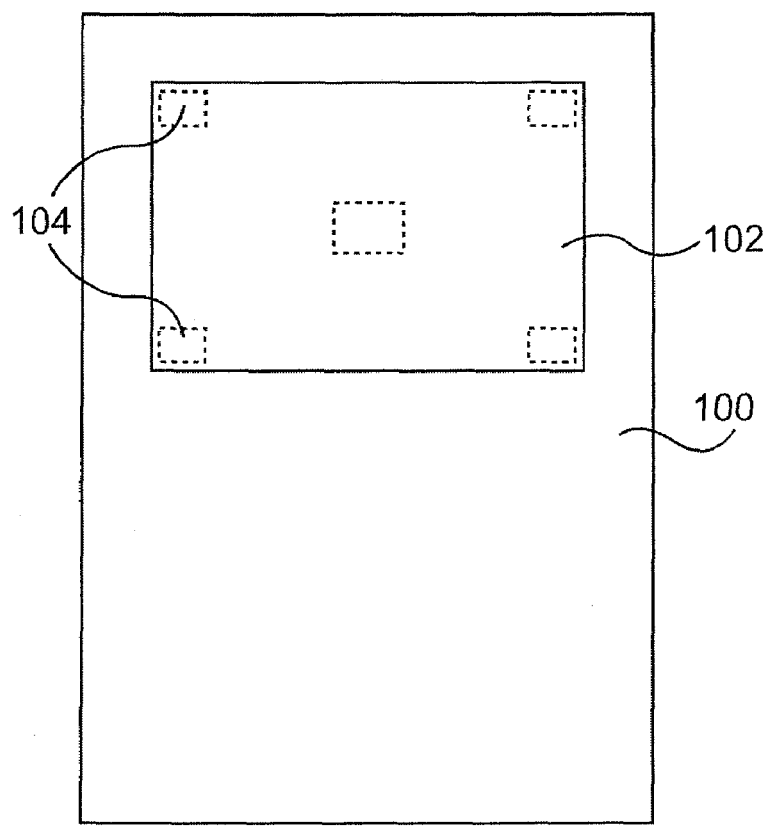
FIG. 3 is a top view of the present invention.
Figure 4:
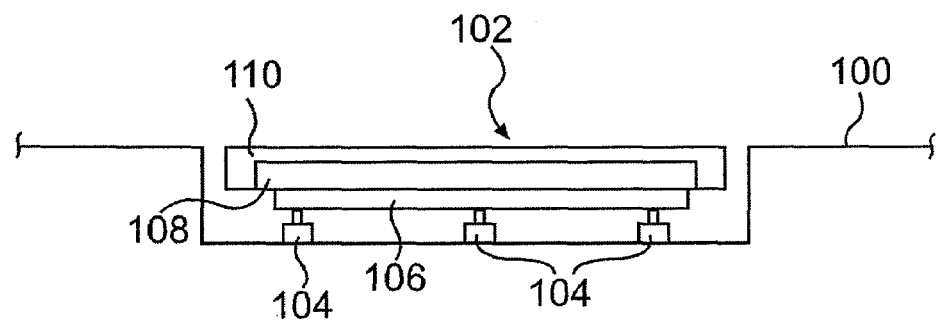
FIG. 4 is a cross-sectional view of the present invention.

FIG. 3 shows the present invention in conjunction with an electronic device. The electronic device 100 may be, for example, a cell phone or other similar device. In one section of the surface of the device 100, a display arrangement 102 is provided. The display is preferably flush with the surface of the electronic device 100. The display device has five contacts, indicated in dotted lines 104, formed therebeneath to provide the five position switches. FIG. 4 shows a cross-sectional view of the present invention wherein the display arrangement 102 is set in a recess in a surface of electronic device 100. As can be seen, the top surface of this arrangement is flush with the surface of the electronic device. The switch arrangement includes a manipulator plate 106 which corresponds in function to the manipulator knob of the prior art device. On top of this plate is formed a display device 108. The display device is held in position by a retention clip. The retention clip is a mechanical device holding the display device 108 to the plate 106. A flexible material also may be included along the perimeter of the display and under the retention clip. This flexible material is used to fill the gap between the plate and display and the edge of the surface of the electronic device. This keeps out dust and other foreign material when the display is being pressed. The retention clip and flexible material can be mounted in such a manner that they are flush with the surface. In place of the retention clip, it is also possible to utilize other mechanical connectors or to use an adhesive material. The display apparatus 102 is mounted above a series of switches 104. When the display apparatus is pushed in the center, the central switch 104 is actuated. If the plate is pushed in one of the corner positions, one of the corner switches is actuated. The display apparatus is mounted in a fashion similar to that in the prior art so that a rocking motion is achieved.

In a preferred example, the display arrangement 102 is roughly 1½ inches by 2 inches and can display up to 7 lines of text. However, the device may be used with a display of any size and with any numbers of lines of text.

While FIG. 4 shows the switches as having actuating rods, in fact, it is also possible for contacts to be mounted directly on the manipulator plate 106 and the opposing surface at the bottom of the recess. Thus, instead of discrete switching devices, it is possible for opposing contacts to be used.

Figure 5:
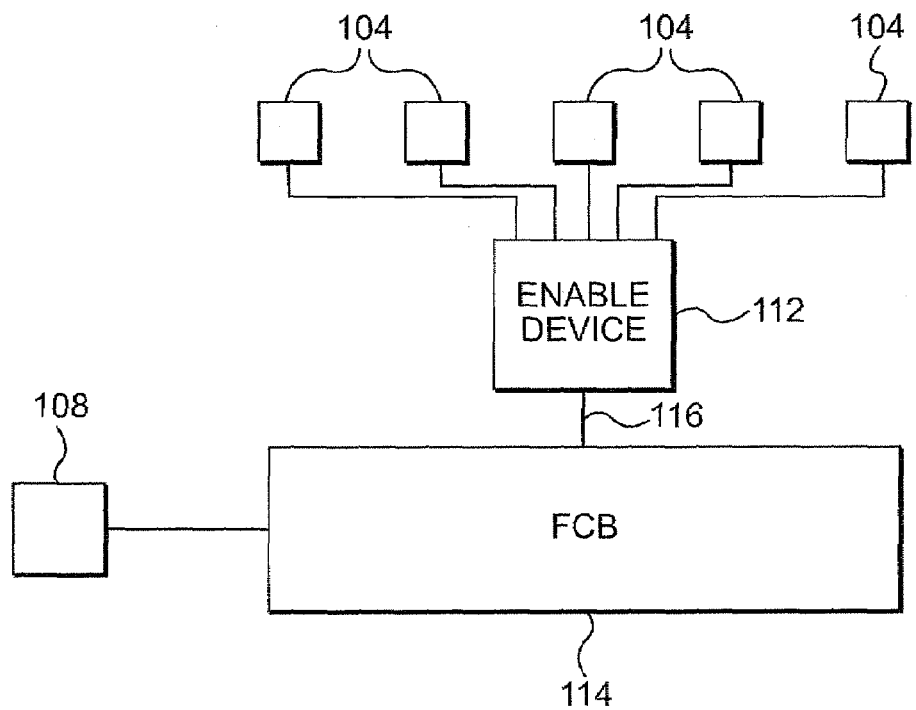
FIG. 5 is an electrical schematic of the present invention.

FIG. 5 is an electrical schematic showing the connections of the various switches to the printed circuit board. Although it is possible for all five switches to be connected directly to the printed circuit board, it is preferable to utilize an enabling device 112 to which the four corner switches are connected. This device disables an input whenever it is within some fixed angle of vertical, such as 20 degrees of vertical. In this way, when the user actuates the switches, the switches will not be actuated unless the input is below 20 degrees to vertical.

While the enabling device has been shown as being an electronic device to determine the angle of input, it could be replaced by mechanical devices which determine the angle if desired.

The various inputs to the printed circuit board are connected to the electronics of the cell phone or other device 100. The display device 108 is also controlled, such as through a driver interface, by the printed circuit board and the components mounted thereon, such as a controller chip.

The display is controlled to identify the function of each of the five switch positions. These functions change along with the use of the switches.

Figure 6A:
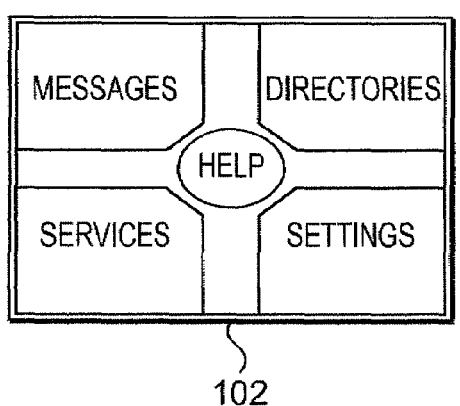
FIGS. 6A and 6B are examples of displayed messages of the present invention.
Figure 6B:
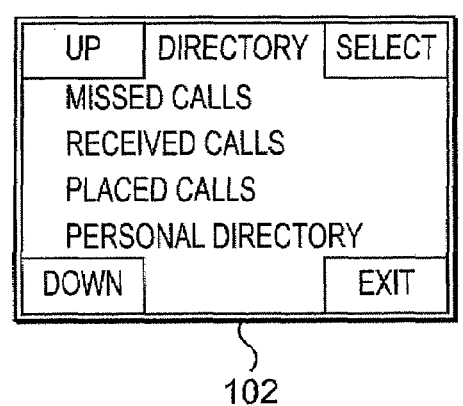

For example, FIG. 6A shows a display indicating the five positions for actuating messages, directories, services, settings and help. If the upper right corner is actuated, a second display is shown indicated with the heading "directory" as shown in FIG. 6B. The four corner positions are then indicated by up, down, select and exit. Thus, the four possible selections in the menu can be changed by hitting the up and down buttons until the desired selection is reached. At that time, the select button may be pressed. If instead it is desired to return to the previous display such as shown in FIG. 6A, the exit button is pushed.

Thus, by using this arrangement, considerable space is saved on the face of the cell phone. It is not necessary to have a separate display for the rocker switch and instead the functions of the five positions of the switch can be easily displayed in a manner which is compact and which allows the user to easily make selections. By combining the display and switch, it is possible to have a larger array for the buttons which make it easier for the user to find the correct contact point. By using this arrangement rather than the soft keys on a main display, context sensitive displays are available on the rocker switch itself. This saves the cost of separate soft key buttons or touch sensitive display. Larger displays can be used on the rocker switch to show more detail to decrease the possibility of erroneous input.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A rocker switch comprising:
a plurality of switches;
a manipulator plate overlying said switches;
a display overlaying said manipulator plate, whereby said manipulator plate is moved in different directions to actuate said switches;
an electronic circuit having functions and being connected to said plurality of switches and said display;
said display indicating functions of said electronic circuit which are selectable by actuation of said switches, positions of said selectable functions on the display corresponding to switches used to select those functions;
said electronic circuit being controlled by actuation of said switches to select said functions;
said display being electronically changeable to indicate selectable functions of said electronic circuit, said displayed selectable functions changing upon actuation of said switches.

2. The switch according to claim 1, wherein said display is held to said manipulator plate using adhesive.

3. The switch according to claim 1, wherein said display is held to said manipulator plate using a retention clip.

4. The switch according to claim 1, further comprising an enabling device for preventing a switch from being enabled where movement of the manipulator plate is near vertical.

5. The switch according to claim 4, wherein the switches are disabled if the movement of the manipulator plate is within 20 degrees of vertical.

6. The switch according to claim 1, wherein said electronic circuit is a circuit board.

7. A cell phone comprising:
a rocker switch including:
a plurality of switches;
a manipulator plate overlying said switches;
a display overlaying said manipulator plate, whereby said manipulator plate is moved in different directions to actuate said switches;
an electronic circuit having functions and being connected to said plurality of switches and said display;
said display indicating functions of said electronic circuit which are selectable by actuation of said switches, positions of said selectable functions on the display corresponding to switches used to select those functions;
said electronic circuit being controlled by actuation of said switches to select said functions;
said display being electronically changeable to indicate selectable functions of said electronic circuit, said displayed selectable functions changing upon actuation of said switches.

8. The cell phone according to claim 7, further comprising a recess formed in a surface of said cell phone, wherein said rocker switch is mounted in said recess.

9. The cell phone according to claim 8, wherein a top surface of said display is flush with said surface.

10. A cell phone comprising:
a rocker switch including:
a plurality of switches;

a manipulator plate overlying said switches;

a display overlaying said manipulator plate, whereby said manipulator plate is moved in different directions to actuate said switches;

an enabling device for preventing a switch from being enabled where movement of said manipulator plate is within 20 degrees of vertical;

an electronic circuit having functions and being connected to said plurality of switches and said display;

said display indicating functions of said electronic circuit which are selectable by actuation of said switches, positions of said selectable functions on the display corresponding to switches used to select those functions;

said electronic circuit being controlled by actuation of said switches to select said functions;

said display being electronically changeable to indicate selectable functions of said electronic circuit, said displayed selectable functions changing upon actuation of said switches;

a recess formed in a surface of said cell phone, said rocker switch being mounted in said recess, a top surface of said display being flush with said surface.

* * * * *